March 31, 1964 P. L. TARDREW ETAL 3,127,315
HYPOCHOLESTEROLEMIC AGENT M-850 AND METHOD OF PREPARATION
Filed April 12, 1962
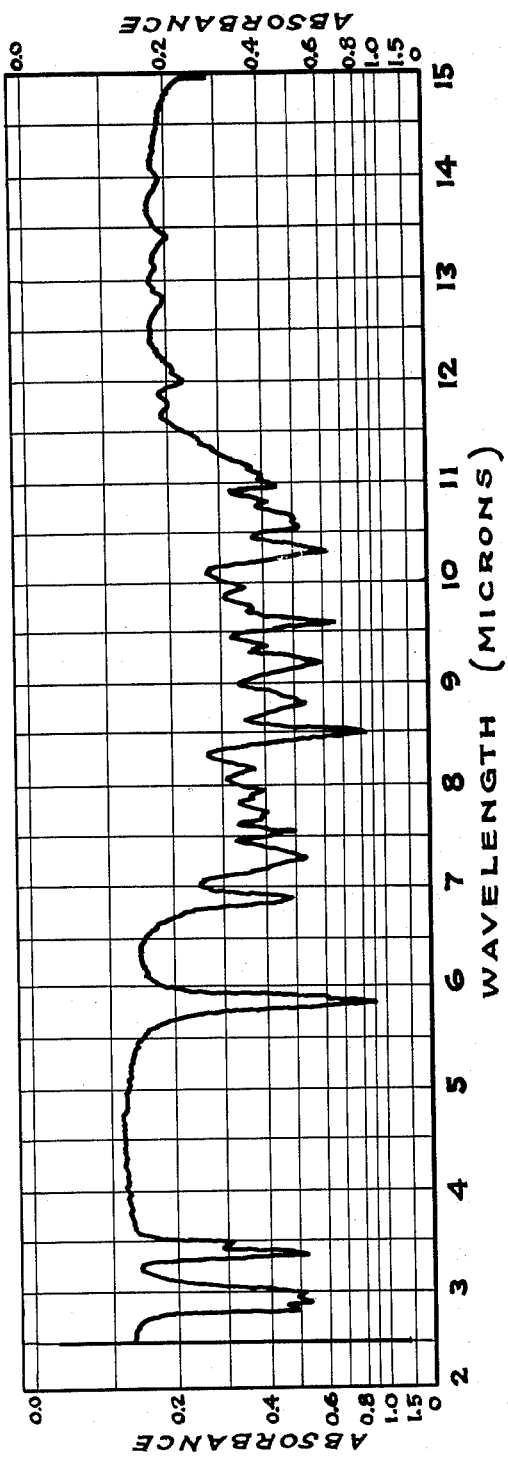
Inventors
Melvin A. Nyman
Philip L. Tardrew
By Henry P. Stevens

United States Patent Office 3,127,315
Patented Mar. 31, 1964

3,127,315
HYPOCHOLESTEROLEMIC AGENT M-850 AND
METHOD OF PREPARATION
Philip Leslie Tardrew, Waukegan, and Melvin Anton
Nyman, Libertyville, Ill., assignors to Abbott Laboratories, North Chicago, Ill., a corporation of Illinois
Filed Apr. 12, 1962, Ser. No. 186,924
5 Claims. (Cl. 167—65)

This invention relates to a novel compound possessing hypocholesterolemic properties and to a process for its preparation. More particularly, the invention relates to a novel composition of matter identified herein as hypocholesterolemic agent M-850, to a process for its production by fermentation, to a method for its recovery and concentration from crude solutions including the fermentation broths and its purification.

It is one object of the present invention to provide a new and useful hypocholesterolemic agent. Another object is to provide a process for the production and recovery of said agent.

It has been found that cultivation of various species of Streptomyces and strains derived from them under controlled conditions and on suitable culture media produce a novel composition of matter herein identified as hypocholesterolemic agent M-850. Cultures of such Streptomyces organisms are on deposit with the Culture Collection Unit of the Northern Utilization Research and Development Division, United States Department of Agriculture, Peoria, Illinois, under the Code NRRL 2361, 2360, 2359 and 2338. The taxonomy of these organisms has already been described in U.S. Patent 2,653,899.

GENERAL SPECIFICATIONS OF FERMENTATION PROCESS

M-850 is produced by growing *Streptomyces erythreus* under controlled conditions which include a temperature range of 28° to 40° C., submerged fermentation with suitable agitation and aeration using media consisting of a carbon source such as glucose and soybean oil; a source of organic nitrogen such as soybean meal, corn steep liquor or peptone; mineral salts such as sodium chloride; an insoluble buffering agent to prevent the accumulation of acid such as calcium carbonate and nontoxic defoaming agents such as methylpolysiloxane antifoam or polyglycol. When the growth of the organism has produced a satisfactory amount of erythromycin, normally 5 to 7 days depending upon the medium and the equipment used, a filtrate from the whole culture or the whole culture may be processed to recover the active components, the erythromycin and the hypocholesterolemic agent. The amount of erythromycin and the hypocholesterolemic agent M-850 produced may be ascertained by a differential assay using the chemical reagent arsenomolybdate. The procedures involved are more fully described and illustrated in the examples. The specific substance thus obtained, M-850, possesses unique and valuable properties and possesses characteristics which distinguish it from the known and previously described erythromycins.

GENERAL SPECIFICATION OF THE RECOVERY PROCESS

The production of M-850 during the fermentation is followed by periodic sampling of the whole culture. The sample is extracted with a water immiscible solvent such as amyl acetate at alkaline pH according to previously described methods for isolation of erythromycin. The amyl acetate solution may be backwashed at acid pH to solubilize the erythromycin in the aqueous phase. The chemical assay may be done on aliquots of the amyl acetate solution before and after the acidic wash to give blue colors whose intensities are proportional to the sum of the erythromycin and M-850 for unwashed organic phase and to the M-850 content for the washed organic phase.

After several days of fermentation when the color reaction with the arsenomolybdate reagent shows that the culture has produced a satisfactory amount of M-850, it is recovered by extracting the whole culture or a filtrate of it with amyl acetate, a particularly efficient solvent, although other water immiscible solvents may be used.

Unlike erythromycin, the efficiency of the extraction of M-850 is not appreciably affected by pH. Thus, only the M-850 may be extracted by the solvent from the whole culture or filtrate at an acidic pH or the M-850 may be extracted together with the erythromycin after adjusting the pH in the range of 8.5–10.5. To rid such a solution of the erythromycin, it is sufficient to wash it with a buffer at a pH of 4 to 5.

A crude solid preparation of M-850 may be obtained by concentrating the solvent phase at reduced pressure. Crystallization proceeds and is allowed to continue overnight at room temperature or below. The solids are filtered and washed with a solvent such as hexane or trichloroethylene which show little solvent capacity for M-850 but high capacity for the lipids which are also extracted during this procedure. The M-850 is crystallized from ethyl alcohol, ethyl acetate or other suitable solvents.

The following examples illustrate the formation, recovery, concentration, purification and identification of hypocholesterolemic agent M-850 but are not intended to limit the invention to the precise techniques employed therein.

Example 1

Isolation of M-850 from a 30-liter fermentation using a methyl isobutyl ketone extraction process:

To 7.5 liters of fermented liquor from the cultivation of *Streptomyces erythreus*, NRRL 2361, performed essentially as described in U.S. Patent 2,653,899 in 30-liter equipment is added 5 liters of a 10% solution of zinc sulfate in water. The solution is stirred and a commercially available diatomaceous filter aid sold under the trade name of Hyflo Super Cel is added together with 5 liters of a 0.5 normal aqueous solution of sodium hydroxide. Suction filtration yields a clear filtrate whose pH is 6.5.

The filtrate is extracted twice with methyl isobutyl ketone, using 5 liters of methyl isobutyl ketone each time. After each extraction, the mixture is allowed to stand until the phases separate and the methyl isobutyl ketone phase is drawn off. The two portions of methyl isobutyl ketone are combined and concentrated to dryness at reduced temperature under vacuum to a reddish oily residue.

The addition of 50 ml. of trichloroethylene dissolves most of the oily residue leaving white crystalline material which is filtered off. Recrystallization from ethyl alcohol gives 48 mg. of crystalline M-850 with a melting point of 222°–225° C.

Example 2

Isolation of M-850 from 200 liters fermented liquor using methyl isobutyl ketone extraction process at alkaline pH:

To 200 liters of fermented liquor prepared essentially as described in the preceding example are added with continuous stirring 200 liters of a solution of 10% zinc sulfate in water, 200 liters of a 0.5 normal aqueous sodium hydroxide solution and a commercially available diatomaceous filter aid sold under the trade name of Hyflo Super Cel. The solution is stirred for one-half hour and the pH is adjusted to 7.4 with an aqueous sodium hydroxide solution or an aqueous sulfuric acid solution whichever is required. Filtration yields a clear filtrate.

The pH of the filtrate is adjusted to 9.4 with 10 normal aqueous sodium hydroxide and is extracted once with 200 liters of methyl isobutyl ketone. Separation of the phases is accomplished by centrifugation and the aqueous phase is discarded.

The methyl isobutyl ketone solution is extracted three times with a total of 150 liters of phosphate buffer of pH 4.5 prepared by dissolving 4.1 kg. of monopotassium phosphate in 150 liters of water. The aqueous phase is again discarded. The methyl isobutyl ketone solution is washed once more with 50 liters of water.

The methyl isobutyl ketone solution is concentrated in a rotary evaporator under reduced pressure to a volume of several hundred ml. Hexane is added and M–850 allowed to crystallize. After standing overnight, the crystals are collected and washed with hexane. The weight of the dried material is 66 grams. Recrystallization from ethyl acetate gives 53 grams of M–850 with a melting point of 227°–228° C. Concentration of the mother liquors yields another 9 grams of product with a melting point of 225°–226° C.

*Example 3*

Recovery of M–850 from Spent Amyl Acetate from the Erythromycin Recovery Process:

Amyl acetate which has been used repeatedly for the extraction of the erythromycin from fermentation liquors and from which the erythromycin has been removed by extraction with water at acidic pH according to U.S. Patent 2,653,899 is a fertile source of M–850. Such a solution is evaporated in a rotary still under vacuum to recover the amyl acetate for reuse in the antibiotic recovery process leaving an oily residue which is largely composed of the unmetabolized vegetable oils added as nutrients for the growing *Streptomyces erythreus*.

Twelve hundred liters of amyl acetate as described above is evaporated to 350 liters. Allowed to stand, this solution deposits crystalline material which is removed by filtration and washed with hexane. The weight of the dried material is 900 grams and has a melting point of 221°–224° C. A solution of this material in ten volumes of hot ethyl alcohol deposits 650 grams of crystalline M–850 melting at 228° C.

*Example 4*

Recovery of M–850 from fermentation liquors by selective solvent extraction:

Two liters of fermented liquor are treated with zinc sulfate and sodium hydroxide as in Example 1 to give 3400 ml. of filtered solution. The solution is adjusted to pH 9.5 with an aqueous sodium hydroxide solution and extracted twice with methylcyclohexane using 1500 ml. of methylcyclohexane each time. After each extraction, the mixture is allowed to stand until the phases separate and the methylcyclohexane phase is drawn off. The methylcyclolohexane solution which contains the erythromycin is discarded.

The aqueous solution is again extracted two times using 1500 ml. of methylisobutyl ketone each time. After each extraction, the mixture is allowed to stand until the phases separate and the methylisobutyl ketone is drawn off. The two portions of methylisobutyl ketone are combined and concentrated to dryness at reduced temperature and under vacuum to give crystalline material weighing 0.715 gram. Crystallization from ethyl alcohol gives crystalline M–850 with a melting point of 228° C.

When M–850 is prepared as a KBr pellet and its infrared spectrum is recorded on a spectrometer, the following absorption bands are noted:

| Wavelength (microns) | Frequency (cm.$^{-1}$) | Relative* Intensity | Wavelength (microns) | Frequency (cm.$^{-1}$) | Relative* Intensity |
|---|---|---|---|---|---|
| 2.83 | 3,534 | S | 9.20 | 1,087 | M |
| 2.90 | 3,448 | S | 9.35 | 1,070 | W |
| 2.98 | 3,356 | S | 9.57 | 1,045 | M |
| 3.36 | 2,976 | S | 9.73 | 1,028 | W |
| 3.46 | 2,890 | M | 9.95 | 1,005 | W |
| 5.83 | 1,715 | S | 10.28 | 973 | M |
| 5.89 | 1,698 | S | 10.52 | 950 | M |
| 6.85 | 1,460 | M | 10.64 | 940 | M |
| 7.15 | 1,399 | M | 10.77 | 928 | W |
| 7.25 | 1,379 | M | 10.95 | 913 | W |
| 7.52 | 1,330 | M | 11.75 | 851 | W |
| 7.70 | 1,299 | W | 11.98 | 834 | W |
| 7.83 | 1,277 | W | 12.78 | 782 | W |
| 7.92 | 1,263 | W | 13.08 | 764 | W |
| 8.12 | 1,231 | W | 13.40 | 746 | W |
| 8.50 | 1,176 | S | 13.95 | 716 | W |
| 8.80 | 1,136 | M | | | |

*S=Strong; M=Medium; W=Weak (Broad).

The complete infrared spectrum for M–850 is as shown in the accompanying drawing.

The X-ray diffraction pattern of M–850 was as follows:

| d-spacing in Angstroms | Estimated Relative Intensity | d-spacing in Angstroms | Estimated Relative Intensity |
|---|---|---|---|
| 10.3 | 10 | 3.12 | 2 |
| 7.7 | 3 | 3.01 | 1 |
| 7.3 | 2 | 2.90 | 3 |
| 6.8 | 3 | 2.76 | 2 |
| 5.8 | 6 | 2.68 | 2 |
| 5.5 | 1 | 2.62 | 1 |
| 5.2 | 5 | 2.52 | 3 |
| 4.9 | 8 | 2.46 | 2 |
| 4.5 | *4 | 2.37 | 3 |
| 4.15 | 3 | 2.29 | 1 |
| 4.05 | 2 | 2.22 | 3 |
| 3.90 | 2 | 2.14 | 2 |
| 3.75 | 2 | 2.02 | 2 |
| 3.64 | 4 | 1.94 | 2 |
| 3.58 | 1 | 1.89 | *1 |
| 3.42 | 3 | 1.79 | 1 |
| 3.22 | 3 | 1.74 | 1 |

*Broad.

M–850 crystallizes in the form of stout needles from a wide variety of solvents such as ethyl acetate, acetone, methyl ethyl ketone and ethyl alcohol. The crystals melt at 228° C. with some prior sublimation.

The maximum solubility of M–850 in various solvents at room temperature is as follows:

Solvent: Solubility in mg./ml.
Water _____ 1
Methanol _____ 44
Ethanol _____ 16
i-Propanol _____ 7
n-Butanol _____ 7
Acetone _____ 16
Methyl ethyl ketone _____ 9
Diethyl ketone _____ 5
Methylisobutyl ketone _____ 4
Cyclohexanone _____ 17
Diacetone alcohol _____ 20
Ethyl acetate _____ 4
Amyl acetate _____ 3
Methylene dichloride _____ 5
Chloroform _____ 8
Ethylene dichloride _____ 2
Trichloroethylene _____ 2
i-Propyl ether _____ 1
Methylal _____ 12
Dioxane _____ 32
Tetrahydrofuran _____ 55
Formamide _____ 20
Dimethylformamide _____ 40
Pyridine _____ 200
Acetonitrile _____ 4
Methyl cyclohexane _____ 1

M-850 gives a reddish solution when dissolved in warm 50% aqueous sulfuric acid. It reacts with arsenomolybdate reagent to give a blue color similar to that obtained with erythromycin. On a weight basis, M-850 gives a color which is about 60% more intense than that obtained with erythromycin A.

The molecular weight of M-850 as determined by the ebullioscopic method in methanol is 414. When a sample is dissolved in alcohol and saponified with alkali under reflux conditions, it is found that 435 mg. of the crystalline M-850 is saponified per millimole of alkali used.

The ultraviolet absorption spectrum of an absolute ethanol solution exhibits a maximum at 288 millimicrons with an extinction coefficient $$E_{1cm.}^{1\%} \text{ of } 0.98$$

M-850 has a molecular formula of $C_{21}H_{38}O_7$ and analyzes as follows:

Calcd. for $C_{21}H_{38}O_7$: C. 62.66; H, 9.52; O, 27.83. Found: C, 62.58; H, 9.09; O, 27.85.

M-850 is unique in that although it is produced by the same microorganisms which form erythromycin, it has no antimicrobial activity. As previously stated, however, it is useful in lowering cholesterol. In actual tests, when M-850 was incorporated in the diet of rats at a concentration of 0.2% or more of the diet, the amount of cholesterol in the blood of the rats was decreased as much as 200 mg. percent compared to the control group of rats in which the amount of cholesterol was found to increase as much as 160 mg. percent in the absence of M-850. Furthermore, M-850 is a precursor of erythromycin and can be readily converted to erythromycin and related derivatives by the same fermentation techniques employed by those skilled in the art to produce erythromycin.

What is claimed is:

1. A hypocholesterolemic agent designated as M-850 which has the following properties:
   (a) a molecular weight of 414
   (b) a molecular formula of $C_{21}H_{38}O_7$
   (c) an elemental analysis of 62.58% carbon, 9.09% hydrogen and 27.85% oxygen
   (d) an absolute ethanol solution exhibits an ultraviolet absorption maximum at 288 millimicrons with an extinction coefficient $$E_{1cm.}^{1\%} \text{ of } 0.98$$

(e) a melting point of 228° C.
   (f) is readily soluble in methanol, ethanol, acetone, cyclohexanone, diacetone alcohol, dioxane, tetrahydrofuran, formamide, dimethylformamide and pyridine but substantially insoluble in water, diethyl ketone, methylisobutyl ketone, ethyl acetate, methylene dichloride, trichloroethylene, hexane, isopropyl ether, acetonitrile and methyl cyclohexane
   (g) an infrared spectrum as shown in the drawing and
   (h) an X-ray diffraction pattern which exhibits d-spacings in angstroms at 10.3, 7.7, 7.3, 6.8, 5.8, 5.5, 5.2, 4.9, 4.5, 4.15, 4.05, 3.90, 3.75, 3.64, 3.58, 3.42, 3.22, 3.12, 3.01, 2.90, 2.76, 2.68, 2.62, 2.52, 2.46, 2.37, 2.29, 2.22, 2.14, 2.02, 1.94, 1.89, 1.79 and 1.74.

2. The method of producing M-850 which comprises cultivating an M-850 producing strain of *Streptomyces erythreus* selected from the group consisting of strains NRRL 2338, NRRL 2359, NRRL 2360 and NRRL 2361 in a culture medium containing assimilable sources of carbohydrate, nitrogen and inorganic salts under submerged aerobic conditions until a substantial amount of M-850 is produced by said strains in the said culture medium, removing the mycelium from the culture medium, adjusting the pH of the mycelim-free medium to about pH 6.5–10.5, extracting the total M-850 from the medium with a water-immiscible polar solvent and separating the M-850 from any erythromycin present by differential solubility.

3. The method as claimed in claim 2 in which the *Streptomyces erythreus* strain employed is NRRL 2361.

4. The method as claimed in claim 3 in which the water-immiscible polar solvent employed is amyl acetate.

5. The method as claimed in claim 3 in which the water-immiscible polar solvent employed is methylisobutyl ketone.

References Cited in the file of this patent

Sigal et al.: J.A.C.S., vol. 78, No. 2, January 20, 1956, pages 388–395.